United States Patent [19]

Nagai et al.

[11] 4,169,188

[45] Sep. 25, 1979

[54] PHOTOGRAPHIC SUPPORT

[75] Inventors: Yoshiaki Nagai; Keishi Kitagawa, both of Fujinomiya, Japan

[73] Assignee: Fuji Photo Film Co., Ltd., Minami-ashigara, Japan

[21] Appl. No.: 821,862

[22] Filed: Aug. 4, 1977

[30] Foreign Application Priority Data

Aug. 4, 1976 [JP] Japan ................................ 51-92875

[51] Int. Cl.[2] ......................... B32B 23/08; B32B 9/04

[52] U.S. Cl. ..................................... 428/513; 428/538

[58] Field of Search ............... 428/323, 329, 453, 454, 428/488, 512, 513, 538; 96/85, 87 R

[56] References Cited

U.S. PATENT DOCUMENTS

| | | | |
|---|---|---|---|
| 3,247,006 | 4/1966 | Hoge et al. | 428/454 X |
| 3,411,908 | 11/1968 | Crawford et al. | 96/85 X |
| 3,776,761 | 12/1973 | Kato et al. | 428/513 X |
| 3,914,522 | 10/1975 | Saverin et al. | 428/513 |
| 4,042,398 | 8/1977 | Holm et al. | 428/513 X |

*Primary Examiner*—William R. Dixon, Jr.

*Attorney, Agent, or Firm*—Sughrue, Rothwell, Mion, Zinn and Macpeak

[57] ABSTRACT

A photographic support comprising a polyolefin coating on both surfaces of a paper sheet, in which the surface reflection characteristics are in a range of L being above 90, a being from 0.5 to 1.5 and b being from −3 to −5 on the surface on which an image forming layer is to be coated, with the surface reflection characteristics being measured in accordance with JIS Z8722 and defined in accordance with JIS Z8730.

16 Claims, No Drawings

PHOTOGRAPHIC SUPPORT

BACKGROUND OF THE INVENTION

1. Field of the Invention

The present invention relates to a water-proof photographic support.

2. Description of the Prior Art

Photographic printing paper is prepared by coating a photographic emulsion on the surface of a support such as a baryta paper, a polyolefin-coated paper or the like. When pictures printed on printing paper are observed, light is not only reflected at the surface of the photographic emulsion layer, but also the light which has passed through the photographic emulsion layer reaches the support and is reflected at the surface thereof and passes back through the photographic emulsion layer again to reach the observer's eye. Since light is partly or completely absorbed in the photographic emulsion layer in this case, light and shade and color can be seen, and thus images observed. For example, the portions that appear white on a printing paper are not due to the photographic emulsion having a white color, but merely due to the transparency of the photographic emulsion; the light reflected upon the surface of the support is seen and thus the white color of the surface of the support is seen. Conversely, the portions that appear black on a printing paper are a result of the absorption of all of the light in the photographic emulsion layer; therefore, no light reaches the observer's eye so that the appearance is black. The portions that appear red or blue are due to the fact that, while light passes through the photographic emulsion layer and is reflected at the surface of the support and again passes through the photographic emulsion layer, the red or blue light components remain but the other components are absorbed by the photographic emulsion layer so that red or blue only is seen. Accordingly, the purpose of a photographic printing paper support is not only for simply supporting the photographic emulsion, but also has an important role in reflecting light which has passed through the photographic emulsion layer.

Recently, polyolefin-coated papers have been often used as a support for a photographic printing paper. When a polyolefin-coated paper is used as a support for a photographic printing paper, the reflection characteristics are important for the reasons mentioned above. Upon preparation of a polyolefin coated paper, white inorganic pigments such as titanium dioxide, zinc oxide, zinc sulfide or the like are added to the polyolefin layer on the side onto which a photographic emulsion is to be coated in order to enhance the reflectance of the surface of the support. In general, the reflectance of the surface is improved by increasing the amount of white pigments added to the polyolefin layer. However, when the amount of the white pigment in the polyolefin layer is increased, preferred results are not necessarily obtained as a support for a photographic printing paper, although the reflectance of the support is enhanced. In many cases, the reflectance is improved as the amount of white pigments is increased. However, the color of the support becomes yellowish so that the visual impression of whiteness is conversely reduced. If such a polyolefin-coated paper is used as a support for a printing paper, the yellowish color is further emphasized after coating a photographic emulsion thereon. Thus, images, particularly the highlight portions, become yellowish and image sharpness is lost so that the value as a printing paper is decreased. In addition, if the amount of white pigments in the polyolefin is increased, extrusion coating of the polyolefin can be conducted only with difficulty and the production cost is also increased. Therefore, a method for improving whiteness appearance without increasing the amount of white pigments is required.

One method for improving the whiteness of the support is a method which comprises adding a fluorescent whitening agent to the polyolefin layer (e.g., as disclosed in Japanese Patent Application (OPI) No. 6531/76 (corresponding to U.S. patent application Ser. No. 592,699, filed July 2, 1975 and to German Patent Application (OLS) No. 2,529,989)). The method comprises improving the whiteness by converting ultraviolet light striking the support into visible light and reflecting the visible light. However, ultraviolet absorbing agents are often used in a color photographic emulsion for the purpose of protecting the images therein. Therefore, ultraviolet light does not reach the surface of the support so that a whitening effect cannot be obtained.

Investigations on the surface reflection characteristics of a polyolefin-coated paper used as a photographic support have now been conducted in great detail and it has been found that in order to improve the whiteness appearance as a printing paper, it is insufficient to merely enhance the reflectance but necessary to maintain the color hue of the surface of the support within a definite range.

A method for measuring and expressing the color tone of paper, polyolefin-coated paper, or the like is set out in JIS Z8722 and JIS Z8730. In accordance with this method, the color tone is expressed by the three numerical values comprising L, a and b. The symbol L represents lightness and the larger the numerical value of L, the higher the lightness. The symbol a represents a reddish color and the larger the numerical value, the stronger is the reddish color; if the numerical value is negative, it means that a reddish color is insufficient, in other words, greenish color is predominant. The symbol b is an indication of a yellowish color and the larger the numerical value, the stronger is the yellowish color; if the numerical value is negative, it means that a yellowish color is insufficient and the color becomes bluish. Where a and b are both zero, the support is colorless. In general, the color tone is expressed by describing the values of a and b with the positions thereof on a graph in which a and b are taken on the ordinate and the abscissa, respectively. The numerical values of L, a and b used in the present invention are those measured using an automatic colorimetric color difference meter, AU-CH-1 Model manufactured by Toyo Rika Kogyo Co., Ltd. In colorimetry a standard board having the numerical values of $L=92.2$, $a=-1.2$ and $b=+0.5$ is used to adjust the colorimeter.

In general, the color tone of the polyolefin-coated paper to which white pigments are added becomes a positive numerical value for a and a positive numerical value for b. For example, where 10% by weight of titanium dioxide is added to polyethylene and such is extrusion-coated on a good quality paper having the values of $L=97.2$, $a=1.6$ and $b=0.5$ in a thickness of 0.040 mm, the color tone becomes $L=96.7$, $a=0.6$ and $b=2.7$, which has a quite strong yellowish color. In order to mask the yellowish color, a method comprising adding a blue coloring agent (bluing) is conventionally used. For instance, if 0.08% by weight of ultramarine blue which is a blue inorganic colorant is added to the above-described polyethylene containing 10% by weight of titanium dioxide and the polyethylene is extrusion-coated in a thickness of 0.040 mm, the color tone becomes L=93.7, a=−0.3 and b=−1.0 and the yellowish color is considerably reduced. If the amount of ultramarine blue added is further increased to 0.15% by weight, the color tone becomes L=92.5, a=−0.6 and b=−4.0 and the support has a bluish color which can hardly be said to be white any longer. Variations in the amount and the kind of blue coloring agents to various extents have now been studied but sufficiently satisfactory results could not be obtained. In addition, it was found that even if a combination in which both a and b values are zero is obtained, the visually observed color is somewhat yellowish. In addition, it was further found that if a photographic emulsion is coated onto such a support and development processing is performed, the gelatin in the emulsion becomes slightly yellowish, because of contamination due to chemicals. Furthermore, it was found that this yellowish color cannot be eliminated by merely using a bluing and if the bluish color of the support is strong, the printing paper appears to be greenish in color.

As a result of these investigations on the color tone of a photographic support, a support which visually appears extremely white has been developed where the values of a and b are in a specific range, but not zero.

SUMMARY OF THE INVENTION

Accordingly, an object of the present invention is to provide a support for a photographic printing paper which has a visually excellent whiteness appearance.

A water-proof photographic support comprising a paper sheet coated with a polyolefin layer on both surfaces of the paper sheet, in which the surface reflection characteristics are within the range of L=above 90, a=0.5 to 1.5 and b=−3 to −5 on the side on which an image-forming layer is to be provided, where the surface reflection characteristics are measured in accordance with the method as defined in JIS Z8722 and as defined in a manner described in JIS Z8730.

DETAILED DESCRIPTION OF THE INVENTION

That is, when the value of a is in a range of from 0.5 to 1.5 and the value of b is in a range of −3 to −5, the color tone visually appears to be extremely white. When a photographic emulsion is coated onto the support in which a and b are in the range set out above, the value of b changes to a somewhat larger value due to the influence of the gelatin and chemicals as was explained above, but the whiteness of the printing paper substantially corresponds to the whiteness of the support, thus an extremely preferred whiteness being obtainable. More specifically, the color tone becomes greenish if the a value is less than 0.5, and if the a value is greater than 1.5, the color tone is too strong; if the b value is greater than −3, the color tone becomes yellowish, and if it is less than −5, the bluish color is too strong. In any case, the visual whiteness appearance is reduced.

Referring to the value of L indicating lightness, L does not directly relate to the color tone but, needless to say, a higher numerical value of L is preferred since light is reflected at the surface of the support as was described above. In fact, if the L value becomes small, a vivid whiteness is lost and images become dark when such is used as a printing paper support. It is desired for the L value to be greater than 90 in order to obtain bright images on a printing paper.

Where the support has the L, a and b values in the ranges set out above, it is impossible to obtain the same only by adding white pigments and conventional bluing agents to a polyolefin. By further adding red or violet coloring agents in addition to conventional bluing agents, it has become possible for the first time to obtain a support having the a and b values in the range set out above.

That is, it has now become possible to obtain a support having a visually high whiteness appearance, by using a colored composition which colorimetrically has values in the range of L=65, to 75, a=5.0 to 10.0 and b=−35 to −15 in a one side laminated paper obtained by laminating in a thickness of 0.040 mm a low density polyethylene resin (density: 0.910–0.935 g/cm$^3$) containing 2% by weight of the colored composition having incorporated therein a red or violet coloring agent in addition to a conventional blue coloring agent, on a base paper having a color tone in the range of L=97.2 to 97.4, a=1.6 to 1.8 and b=0.5 to 0.9.

For example, if 0.2% by weight of a violet type inorganic coloring agent (Daiichi Violet DV-1, made by Daiichi Kasei Kogyo Co., Ltd.) having values of L=92.0, a=4.1 and b=−3.0 when incorporated alone in the above-described polyethylene in an amount of 2% by weight is additionally added to the above-described polyethylene containing 10% by weight of titanium dioxide and 0.15% by weight of ultramarine blue having values of L=62.3, a=5.9 and b=−46.0 when incorporated alone in the above-described polyethylene in an amount of 2% by weight, the color tone becomes L=91.0, a=1.1 and b=−4.5; in which yellow color and blue color disappear and the color becomes very white. In this case, the value of L is decreased when compared to the case in which 10% by weight of titanium dioxide alone is added to the polyethylene. While the reflectance is obviously reduced, a polyethylene coated paper support in which ultramarine blue and DV-1 are incorporated into the polyethylene has a much better whiteness.

In addition, similar results can be obtained even in the case of a red type inorganic coloring agent (Daiichi Pink DP-1, made by Daiichi Kasei Kogyo Co., Ltd.) having values of L=93.3, a=4.9 and b=−1.0 when incorporated alone in the above-described polyethylene in an amount of 2% by weight.

Cobalt violet can be used as a violet type coloring agent. Mixtures of a red inorganic pigment and a blue inorganic pigment can also be employed in this invention.

The extrusion coating of polyolefins is generally performed at high temperatures above about 300° C. Suitable techniques for extrusion coating of a polyolefin layer with a pigment dispersed therein are described in U.S. Pat. Nos. 3,411,908, 3,076,720, 3,253,922 and 3,884,692 and such can be used herein as well. Therefore, in view of extrusion coating as essential requirements, the colored composition must have a heat resistance of above about 300° C., must not bleed out, must not sublime, must be easily dispersed in polyolefins, etc. Further as essential properties, the colored composition must have a high coloring capability, have good resistance to chemicals, must not adversely influence photographic emulsion layer(s), etc. Organic coloring agents are often unsatisfactory in heat resistance, and easily bleed out, although organic coloring agents have a high coloring capability. On the other hand, of the inorganic coloring agents, DV-1 and DP-1 satisfy all the characteristics required and, therefore, are suitable as pigments for the polyolefin layer of photographic supports.

The amount of the inorganic colored pigment composition employed in the polyolefin resin layer in accordance with the present invention is suitably chosen depending on the amount of white pigments employed and the thickness of the coated layer extrusion coated, but, in general, the inorganic colored pigment composition is incorporated in an amount of about 0.1 to about 3 wt%, preferably 0.1 to 0.4 wt%, based on the total amount of the polyolefin resin and the white pigment. The coloration is poor when the amount added is less than about 0.1 wt% so that high whiteness visual appearance cannot be obtained. Further, if the amount added exceeds 3 wt%, the color becomes dull and the whiteness visual appearance is decreased.

In the present invention, polyethylenes are generally employed as the polyolefins, but there is no special limitations thereon as long as the polyolefins can be used in extrusion coating. Suitable examples of polyolefins include homopolymers of $\alpha$-olefins having 2 to 8 carbon atoms such as polyethylene, polypropylene, polybutene, poly-3-methylbutene, etc., copolymers comprising ethylene, propylene, or butene such as ethylene-propylene copolymers, ethylene-butene copolymers, ethylene-vinyl acetate copolymers, propylene-vinylidene chloride copolymers, propylene-maleic anhydride copolymers, etc.

In addition, there is no specific limitation as to the thickness of the layer of these polyolefin resins, but, in general, it is preferred for the thickness to be about 10 to about 100 microns, particularly about 15 to about 50 microns when such is used in a photographic printing paper.

The nature of the surface of the polyolefin layer, such as a mirror surface, a surface having a regular unevenness, a surface having an irregular unevenness, etc., can vary and any of these types of surfaces can be used.

The surface of the polyolefin resin layer can be subjected to surface activation treatments, such as a corona discharge treatment, a flame treatment, etc. If desired, a subbing layer is provided on the surface thus surface-treated. A photographic emulsion layer(s) is coated thereon to produce a photographic printing paper.

In addition, titanium dioxide, zinc oxide, talc, clay, calcium carbonate, silica, alumina, magnesium oxide, zirconium oxide, lithopone, lead white, gypsum, etc., can be used as the white pigments, alone or in combination in an optional ratio. A preferred amount of the white pigment in the polyolefin resin layer ranges from about 5 wt% to about 30 wt%, preferably 7 to 10 wt%, based on the weight of the polyolefin resin.

A dispersing agent selected from various types of surface active agents, higher aliphatic acids and salts thereof can be employed in order to improve the dispersibility of the white pigment or inorganic colored pigment in the polyolefin. Further, fluorescent whitening agents, antistatic agents, antioxidants, stabilizing agents, and the like can also be employed.

The photographic support in accordance with the present invention can be used as supports for conventional silver halide photographic emulsions using, as a binder, natural high molecular weight materials such as gelatin, gelatin derivatives, etc., synthetic high molecular weight materials such as polyvinyl alcohol, polyvinyl pyrrolidone, etc., supports for printing papers for color photographic emulsions, supports for image-receiving layers for the diffusion transfer system or supports for diazo-sensitive photographic emulsions (e.g., as disclosed in U.S. Pat. No. 3,833,380, etc.).

The present invention will be explained in more detail with reference to the examples below, but the present invention is not to be construed as being limited thereto.

The colorimetry performed in the examples is as described in the body of the specification.

Unless otherwise indicated, all parts, percents, ratios and the like are by weight.

EXAMPLE 1

Onto a base paper of a basis weight of 180 g/m$^2$ with colorimetric data of L=97.2, a=1.7 and b=0.7, a polyethylene containing 2 wt% of an inorganic colored pigment composition comprising either bluish ultramarine blue or reddish ultramarine blue and either a violet type pigment, Daiichi Violet DV-1, or a red type pigment, Daiichi Pink DP-1, made by Daiichi Kasei Industry Co., Ltd. was coated in a thickness of 0.040 mm by extrusion coating at 300° C. The composition and composition ratio of the inorganic colored pigment composition are shown in Table 1 herebelow. The evaluations of a printing paper using (1) colorimetric data of the colored pigment obtained by colorimetry of the laminate paper, (2) colorimetric data of the support samples for a photographic printing paper, Nos. 1 to 6, prepared by covering the back surface of the same base paper with polyethylene in a thickness of 0.040 mm and thereafter by covering the surface of the base paper with polyethylene containing the above-described inorganic colored pigment in the amount as shown in Table 1 below and 7.5 wt% of titanium oxide, (3) visual evaluation of the support samples (2) for a printing paper, and (4) whiteness (corresponding to the highlight portions of images) of the photographic printing papers obtained by coating photographic emulsion onto each of these support samples for a printing paper and then subjecting them unexposed to development processing are shown in Table 1 below.

TABLE 1

| Sample | Composition of Colored Pigment | | Composition Ratio A/B of Colored | Colorimetric Data (1) of Colored Pigment | | | Amount of Colored Pigment Added* | Colorimetric Data (2) | | | Visual Evaluation | Evaluation (4) as a Printing |
|---|---|---|---|---|---|---|---|---|---|---|---|---|
| No. | A | B | Pigment | L | a | b | (wt %) | L | a | b | (3) | Paper |
| 1 | Reddish Ultra-marine Blue No. 1500 | DV-1 | 32/18 | 72.5 | 7.0 | −24.8 | 0.04 | 95.9 | 0.3 | 1.3 | Quite Yellowish | No Good |
| 2 | " | " | " | " | " | " | 0.08 | 94.3 | 0.6 | −1.0 | Somewhat Yellowish | " |

TABLE 1-continued

| Sample No. | Composition of Colored Pigment A | Composition of Colored Pigment B | Composition Ratio A/B of Colored Pigment | Colorimetric Data (1) of Colored Pigment L | a | b | Amount of Colored Pigment Added* (wt %) | Colorimetric Data (2) L | a | b | Visual Evaluation (3) | Evaluation (4) as a Printing Paper |
|---|---|---|---|---|---|---|---|---|---|---|---|---|
| 3 | " | " | " | " | " | " | 0.20 | 92.5 | 1.1 | −4.0 | Preferred White | Good |
| 4 | Reddish Ultra-marine Blue No. 5000 | DP-1 | 25/25 | 72.0 | 9.8 | −18.1 | 0.20 | 92.3 | 1.4 | −3.1 | " | " |
| 5 | Bluish Ultra-marine Blue No. 2000 | DP-1 | 28/22 | 71.1 | 9.5 | −20.3 | 0.20 | 92.0 | 1.3 | −3.8 | " | " |
| 6 | Reddish Ultra-marine Blue No. 1900 | DV-1 | 30/20 | 72.8 | 7.0 | −26.3 | 0.20 | 92.6 | 1.1 | −4.5 | " | " |

*Amount added expressed as a wt % to the total amount of polyethylene and titanium dioxide As can be seen from the results in Table 1 above, the whiteness of the support Samples Nos. 3 to 6 for a printing paper was visually high and in addition, the whiteness of the printing papers obtained from these support samples is high, which shows that supports in accordance with these support samples are very valuable for a printing paper.

Further, it can be seen that, when the colored pigments used in the present invention are employed, supports having a high whiteness appearance were obtained by choosing the amount of the colored pigments added appropriately.

Comparison Example 1

Onto a base paper as described in Example 1, polyethylene containing 2 wt% of bluish ultramarine blue or reddish ultramarine blue, which was one component of the colored pigment composition used in Example 1, was laminated in a thickness of 0.040 mm. The evaluations obtained by (1) colorimetric data on these laminate paper samples (2) colorimetric data on printing paper support sample Nos. 7 to 12 prepared by coating the back surface of the same base paper with polyethylene in a thickness of 0.040 mm and thereafter coating the surface thereof with polyethylene containing the inorganic colored pigment in the amount as shown in Table 2 below and 7.5 wt% of titanium dioxide, (3) a visual evaluation of these printing paper support samples, and (4) an evaluation of the printing papers prepared from the printing paper support samples in a manner similar to Example 1 are shown in combination in Table 2 below.

TABLE 2

| Sample No. | Colored Pigment | Colorimetric Data (1) of Colored Pigment L | a | b | Amount of Colored Pigment Added* (wt %) | Colorimetric Data (2) L | a | b | Visual Evaluation (3) | Evaluation (4) as a Printing Paper |
|---|---|---|---|---|---|---|---|---|---|---|
| 7 | Reddish Ultramarine Blue No. 1500 | 64.2 | 4.7 | −41.4 | 0.04 | 95.2 | 0.1 | 0.1 | Quite Yellowish | No Good |
| 8 | " | " | " | " | 0.08 | 93.7 | −0.4 | −2.2 | Yellowish Green | " |
| 9 | " | " | " | " | 0.20 | 90.4 | −0.6 | −5.8 | Quite Bluish | " |
| 10 | Reddish Ultramarine Blue No. 5000 | 62.3 | 3.0 | −40.2 | 0.20 | 89.6 | −0.7 | −5.3 | " | " |
| 11 | Bluish Ultramarine Blue No. 2000 | 64.0 | 4.8 | −42.5 | 0.20 | 90.3 | −0.6 | −6.0 | " | " |
| 12 | Reddish Ultramarine Blue No. 1900 | 64.7 | 5.2 | −45.3 | 0.20 | 90.4 | −0.4 | −6.5 | " | " |

*Amount added expressed as a wt % to the total amount of polyethylene and titanium dioxide As can be seen from the results as shown in Table 2 above, the bluish color simply increases or decreases depending on the increase or decrease of the amount added of the conventional ultramarine blue as a bluing, but a high whiteness visual appearance cannot be obtained.

In addition, the colorimetric data obtained with the above-described printing paper support samples are all outside the range called for in the present invention. A high whiteness visual appearance is not obtained in any of the cases and printing papers obtained using these support samples are unsuitable.

While the invention has been described in detail and with reference to specific embodiments thereof, it will be apparent to one skilled in the art that various changes and modifications can be made therein without departing from the spirit and scope thereof.

What is claimed is:

1. In a water-proof photographic support comprising a paper sheet coated with a polyolefin on both surfaces thereof, the improvement which comprises the polyolefin on at least one of said surfaces containing a white pigment and a member selected from the group consisting of a violet-type coloring agent, a red-type coloring agent or a mixture thereof, and the surface reflection characteristics of the coated surface being in a range of L=above 90, a=0.5 to 1.5 and b=−3 to −5, the combination of the white pigment and the member selected from said group having colorimetric values of L=65 to 75, a=5.0 to 10.0 and b=−35 to −15, where the surface reflection characteristics are measured in accordance with the method as defined in JIS Z8722 and as defined in a manner described in JIS Z8730.

2. The water-proof photographic support as claimed in claim 1, wherein said polyolefin coated on at least one surface of said support contains titanium dioxide and a member selected from the group consisting of a violet-type inorganic coloring agent, a red-type inorganic coloring agent or a mixture thereof having colorimetric values of L=65 to 75, a=5.0 to 10.0 and b=−35 to −15, said colorimetric values being measured for said pigments when they are contained in a low density polyethylene resin layer having a thickness of 0.040 millimeters in an amount of 2% by weight and in the copresence of a conventional blue coloring agent, said 2% by weight figure including the amount of said conventional blue coloring agent, said layer being laminated to one side of a base paper having a color tone in the range of L=97.2 to 97.4, a=1.6 to 1.8 and b=0.5 to 0.9.

3. The water-proof photographic support as claimed in claim 1, wherein said violet-type or red-type coloring agent is an inorganic colored pigment.

4. The water-proof photographic support as claimed in claim 3 wherein said white pigment is titanium dioxide.

5. The water-proof photographic support as claimed in claim 5 wherein the amount of said violet-type or red-type pigments is 0.1 to about 3 wt. % based on the total amount of the polyolefin resin and the white pigment.

6. The water-proof photographic support as claimed in claim 5 wherein said polyolefin contains a blue-type coloring agent.

7. The water-proof photographic support as claimed in claim 3 wherein the amount of said violet-type or red-type pigments is 0.1 to about 3 wt. % based on the total amount of polyolefin resin and white pigment.

8. The water-proof photographic support as claimed in claim 1, wherein said polyolefin contains a white pigment, a blue-type coloring agent and a red-type and/or violet-type coloring agent.

9. The water-proof photographic support as claimed in claim 8 wherein said blue-type coloring agent is reddish ultra-marine blue No. 1500, reddish ultra-marine blue No. 5000, bluish ultra-marine blue No. 2000 or reddish ultra-marine blue No. 1900.

10. The water-proof photographic support as claimed in claim 1, wherein said red-type and violet-type coloring agents have colorimetric values of L=65 to 75, a=5.0 to 10.0 and b=−35 to −15, said colorimetric values being measured for said pigments when they are contained in a low density polyethylene resin layer having a thickness of 0.040 millimeters in an amount of 2% by weight and in the copresence of a conventional blue coloring agent, said 2% by weight figure including the weight of said conventional blue coloring agent, said layer being laminated to one side of a base paper having a color tone in the range of L=97.2 to 97.4, a=1.6 to 1.8 and b=0.5 to 0.9.

11. The water-proof photographic support as claimed in claim 1 wherein said white pigment is titanium dioxide.

12. In a water-proof photographic support comprising a paper sheet coated with a polyolefin on both surfaces thereof, the improvement which comprises the polyolefin on at least one of said surfaces containing a white pigment, a conventional blue-type coloring agent and a member selected from the group consisting of a red-type coloring agent, a violet-type coloring agent or a mixture thereof, wherein the surface reflection characteristics of the coated surface coated with said polyolefin containing pigment and coloring agent are in the range of L=above 90, a=0.5 to 1.5 and b=−3 to −5, the combination of the white pigment and the member selected from said group having colorimetric values of L=65 to 75, a=5.0 to 10.0 and b=−35 to −51, where the surface reflection characteristics are measured in accordance with the method as defined in JIS Z8722 and as defined in a manner described in JIS Z8730.

13. The water-proof photographic support as claimed in claim 12 wherein said red-type and violet-type coloring agents are inorganic colored pigments.

14. The water-proof photographic support as claimed in claim 12 wherein the total amount of red-type and violet-type pigment is 0.1 to 3% by weight based on the total amount of polyolefin and white pigment.

15. The water-proof photographic support as claimed in claim 14 wherein said white pigment is titanium dioxide.

16. The water-proof photographic support as claimed in claim 15 wherein said conventional blue-type coloring agent is reddish ultra-marine blue No. 1500, reddish ultra-marine blue No. 5000, bluish ultra-marine blue No. 2000 or reddish ultra-marine blue No. 1900.

* * * * *